Nov. 3, 1931.  F. W. BURGER  1,829,889
WHEEL FOR AUTOMOBILES
Filed June 11, 1927

Witness
Milton Lenoir

Inventor.
Frederick W. Burger,
By John L. Jackson,
Attorney

Patented Nov. 3, 1931

1,829,889

UNITED STATES PATENT OFFICE

FREDERICK W. BURGER, OF NILES, MICHIGAN, ASSIGNOR TO CLARK EQUIPMENT COMPANY, OF BUCHANAN, MICHIGAN, A CORPORATION OF MICHIGAN

WHEEL FOR AUTOMOBILES

Application filed June 11, 1927. Serial No. 198,034.

My invention relates to wheels for automobiles, and particularly to drive wheels for heavy vehicles such as trucks. In motor vehicles designed to transport heavy loads it has been found desirable to provide means for mounting two pneumatic tires on each drive wheel, such wheels being generally known as dual wheels, and owing to the requirements of highway commissions which establish certain maximum loads per inch of tire the tire weights increase so rapidly as their dimensions increase that tire changes on the road become exceedingly difficult. My invention has to do with such dual wheels, and has for its object to provide an improved construction by which two pneumatic tire supporting rims of conventional quick detachable design may be mounted on a single wheel in such manner that they will be tightly secured in place with an equal amount of pressure, but may readily be mounted or demounted when necessary.

My present invention embodies the same generic features of invention as are disclosed in my copending application filed of even date herewith for improvements in dual wheels for motor vehicles, Serial No. 198,035 and is in the nature of a modification of the construction shown and described in said application, by which the construction is simplified in certain respects, so that the wheel will be less expensive to manufacture and somewhat lighter in weight.

In the accompanying drawings,—

Figure 1:
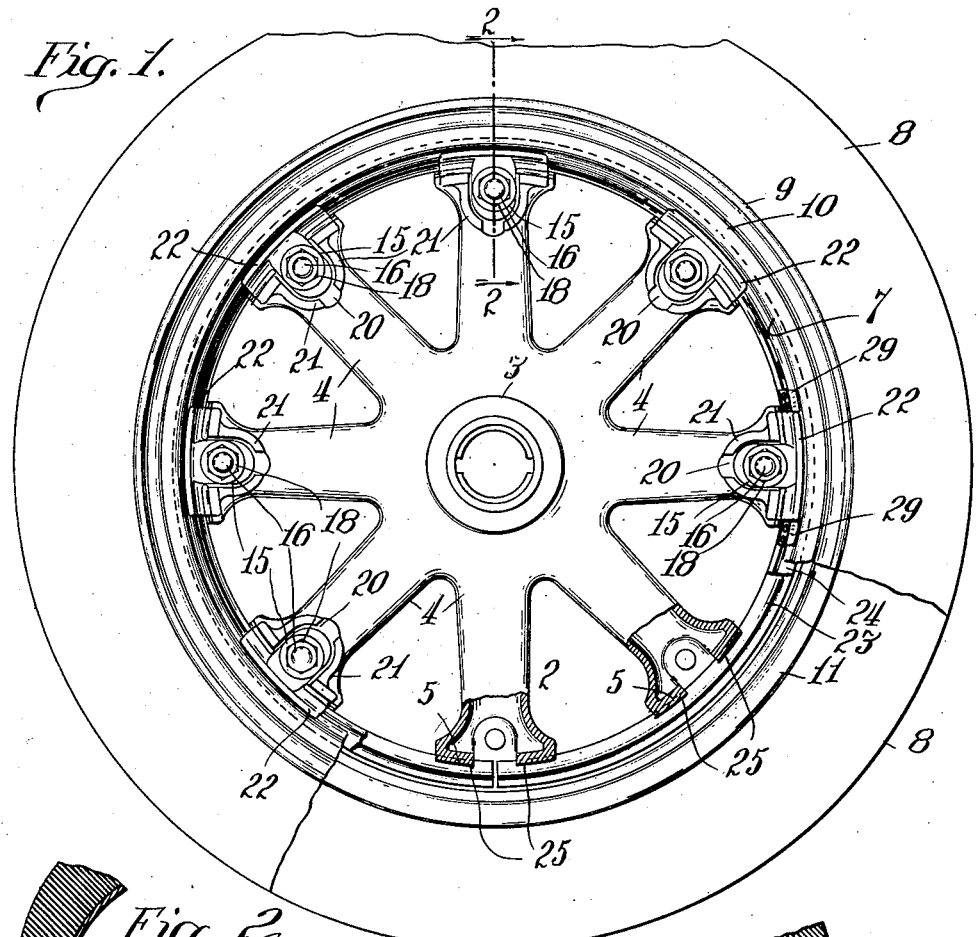
Figure 2:
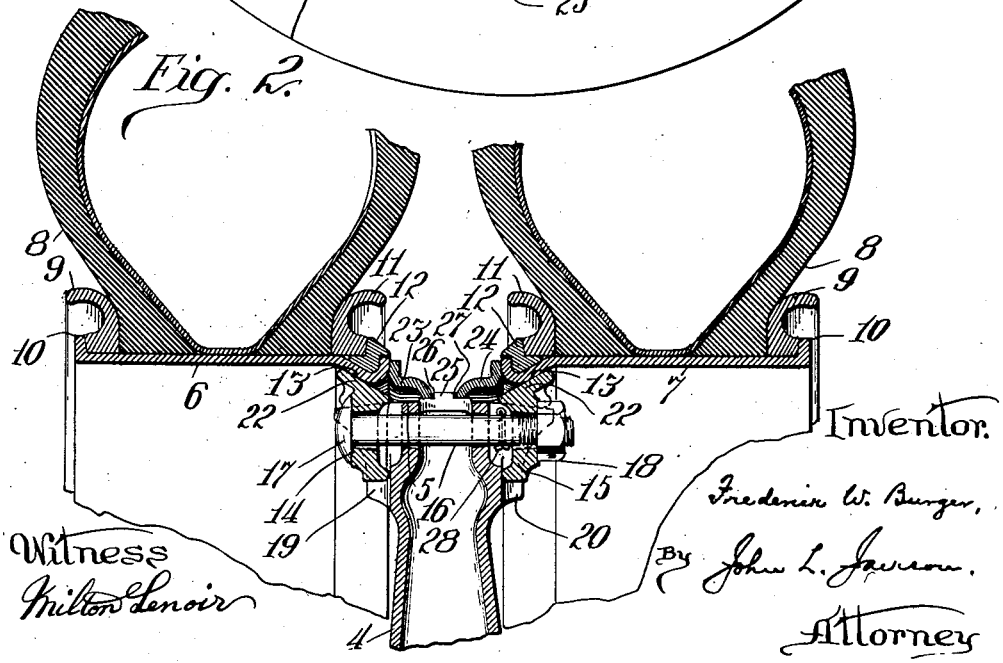

Fig. 1 is a side elevation of my improved wheel, some parts being broken away and other parts being in section; and Fig. 2 is a partial vertical cross-section on line 2—2 of Fig. 1.

Referring to the drawings, in which I have shown my invention embodied in a wheel of the spoke type in which the hub and spokes are cast as a unit, the spokes being hollow, 3 indicates the hub and 4 the spokes, which together constitute a unitary spider or wheel body. The spokes are provided at their radially outer ends with pads or seats 5 transversely disposed with reference to the plane of the wheel, on the outer surfaces of which seats pneumatic tire carrying rims 6, 7 are demountably secured by clamping means that engage the adjacent margins of said rims, as will be hereinafter more specifically described. The rims 6, 7 are duplicates but are oppositely arranged with reference to the wheel body, and are of a common quick detachable type, a pneumatic tire 8 being mounted on each rim between a ring 9 spaced away from the plane of the wheel body and which abuts against a fixed marginal flange 10 on the rim, and a ring 11 adjacent the plane of the wheel body and which is held in place at the inner margin of the rim by a split locking ring 12 that seats in a groove in the radially inturned inner margin 13 of the rim. As the two wheel rims are alike corresponding parts are indicated by the same reference numerals.

The internal diameter of the rims 6, 7 at the margins 13 thereof is somewhat greater than the diameter of the wheel body, and said rims are secured in place upon the opposite end portions of the seats 5 by wedge blocks 14, 15 which bear on said seats and have portions that extend inwardly at the sides of the spokes toward the plane of the wheel body, and are mounted upon the opposite ends of bolts 16 that pass through the outer end portions of the spokes, as best shown in Fig. 2. At one end each of said bolts is provided with a head 17, and at the other end it is provided with a nut 18, so that by screwing up the nut on the bolt the opposite wedge blocks 14, 15 may be drawn together over the seat on which they bear. The portions of said wedge blocks which extend inwardly toward the plane of the wheel body engage in pockets 19, 20 at opposite sides of the spokes, said pockets being formed by laterally projecting flanges 21 formed on the sides of the spokes adjacent to their outer ends, by which arrangement the bolts 16 are relieved of driving strains, since such strains are sustained by the spokes. Each of said wedge blocks is provided with a radially outer wedge portion 22 that engages the inclined margin 13 of the rim mounted upon it, the arrangement being such that by drawing the wedge blocks together and meanwhile holding the rims against movement toward each other said rims may be wedged tightly in place on the wheel body.

For spacing the wheel rims apart and properly positioning them on the wheel body I provide two spacing rings 23, 24, which are split transversely, and are mounted upon the radially outer ends of the spokes at opposite sides of a radial rib 25 formed centrally thereon to provide shoulders 26, 27 against which the adjacent margins of the spacing rings 23, 24 respectively bear. Said spacing rings diverge outwardly and away from the plane of the wheel body, and their margins remote from each other bear against the adjacent margins of the wheel rims 6, 7. It will be evident that when the wedge blocks 14, 15 are drawn together the wheel rims 6, 7 will be moved toward each other to abut against the margins of the spacing rings 23, 24 remote from each other and that said rings will be moved inwardly with respect to each other and into close engagement with the shoulders 26, 27. When the parts have assumed this position the wedge blocks may be drawn up tightly since the spacing rings 23, 24 will prevent further inward movement of the wheel rims.

In mounting the rims on the wheel body the bolts 16, having the inboard wedge blocks 14 mounted thereon, are applied to the wheel body, and the inboard rim 6 is slipped over the wheel body and allowed to rest on said wedge blocks. The inboard spacing ring 23 is then put in position with one margin bearing against the shoulders 26 on the several spokes, after which the other spacing ring 24 is put in position with one of its margins bearing against the shoulders 27. The outboard rim 7 is then applied to the wheel body and the outboard wedge blocks 15 are put in place on the outer ends of the bolts and secured by the nuts 18. To hold the bolts 16 against displacement during the assembling operation they are provided with holes near their outer ends to receive split keys 28, as shown in Fig. 2, said keys being located adjacent to the laterally outer faces of the spokes so that they will prevent removal of the bolts. The spacing rings 23, 24 are split transversely so that the laterally inner ring may be easily slipped over the ribs 25.

It will be seen from the foregoing description that the rims may easily be mounted or demounted, and that the pressure applied to said rims to hold them in place is equalized so that the wedge blocks at both sides of the wheel body are tightened equally, and the rims are held securely in place and properly positioned at opposite sides of the center of the wheel. The driving strains are transmitted to the rims through one or more of the wedge blocks at each side of the wheel body by providing the rims with lugs 29 spaced apart and located so that one of the wedge blocks may fit between them, as shown in Fig. 1. Ordinarily, one set of these lugs is all that is required, but any desired number may be employed.

While I have shown and described my invention as embodied in a wheel of the spoke type, it may also be applied to disc and other wheels. It will be understood, therefore, that the term "wheel body" as used in the claims is intended to comprehend not only a wheel body made up of a hub and spokes, but also one made up of a hub, spokes and a felly or one in which instead of separate spokes a continuous disc is used, except insofar as the claims may be limited by other inclusions therein.

What I claim as my invention and desire to secure by Letters Patent, is—

1. A wheel comprising a wheel body having radial ribs projecting outwardly beyond its periphery, separate tire carrying rims mounted on the peripheral portion of said wheel body, spacing rings mounted on the wheel body and engaging said ribs at opposite sides thereof, said rings forming abutments against which the adjacent margins of said rims bear, and welding means mounted on the wheel body at opposite sides thereof, movable inwardly with respect to each other to engage the adjacent marginal portions of said rims, respectively, to clamp said rims on the wheel body at opposite sides of said spacing rings, and means for applying pressure to said wedging means to press them inwardly with respect to each other to secure said rims in position on the wheel body.

2. A wheel comprising a wheel body having a hub and spokes radiating therefrom, said spokes having seats at their outer ends provided with radial ribs projecting radially outward beyond the surfaces of said seats, said wheel body adapted to support separate tire carrying rims mounted on said seats at opposite sides of the spider, spacing rings mounted on said seats at opposite sides of and bearing against said ribs, said spacing rings forming abutments against which the adjacent margins of said rims bear, separate wedge blocks mounted on said spokes at opposite sides thereof and having wedging engagement with the adjacent marginal portions of said rims, and bolts for drawing said wedge blocks together to clamp said rims against said spacing rings and secure them on the wheel body.

3. A wheel comprising a wheel body having a hub and spokes radiating therefrom, said spokes having seats at their outer ends provided with radial ribs projecting radially outward beyond the surfaces of said seats, said wheel body adapted to support separate tire carrying rims mounted on said seats at opposite sides of the wheel body, spacing rings mounted on said seats at opposite sides of and bearing against said ribs, said spacing rings forming abutments against which the adjacent margins of said rims bear, separate wedge blocks mounted on said spokes at opposite sides thereof and having wedging engagement with the adjacent marginal portions of said rims, and bolts for drawing said wedge blocks together to clamp said rims against said spacing rings and secure them on the wheel body, one of the wedge blocks at each side of the wheel having driving engagement with the corresponding rim.

4. In a wheel having a hub section and a plurality of spokes radiating therefrom, a rib extending beyond the end of each spoke in the plane of the wheel, two rims having inside diameters which permit their being slipped over said ribs, spacing rings split to permit their being slipped over said ribs and positioned between said ribs and the edges of said rims, wedging blocks on each side of each spoke, a through bolt extending through each spoke and the associated wedge blocks, said bolts being equipped with nuts for simultaneously drawing said wedges together to tighten said rims and split rings on said spokes, and means including sockets in said spokes into which said wedge blocks fit for transmitting driving thrust to said rims independently of said bolts.

5. A wheel for vehicles comprising a spider having a hub and spokes radiating therefrom, said spokes having ribs extending beyond their outer ends in the plane of the spokes, laterally disposed pockets at each side of said spokes, bolts extending through said pockets, wedge blocks on said bolts, said blocks resting in the pockets on the vehicle side of said wheel, a demountable rim, a gutter on said rim having an inside diameter slightly greater than the extreme diameter of said ribs and less than the diameter of the circle through the outside edges of said wedge blocks, to permit slipping that rim from the laterally outer side to the laterally inner side of said wheel, into position against said wedge blocks, a spacing ring split to permit its being slipped over said ribs and placed against the laterally outer edge of said rim and the laterally inner edges of said ribs, a second split ring resting against the laterally outer side of said ribs, a second demountable rim having a gutter resting against said second ring, a second wedge block on each of said bolts resting against the laterally outer face of said gutter, and a nut on each of said bolts for drawing said wedges in to lock said rims and rings with respect to said ribs and spokes.

6. A wheel structure comprising a wheel body, means integral therewith acting as an abutment thereon and positioned substantially centrally thereof, two rims having an inside diameter larger than the diameter of said wheel body and said abutment so as to permit their being slipped thereover, spacing means between each of the rims and the abutment and adapted to space each of the rims a fixed distance from the abutment, said spacing means being removable, and wedging means to draw the rims against the spacing means and the spacing means against the abutment.

7. In a wheel, the combination of a wheel body, spaced rims carried by said body, a ridge in the central plane of the wheel, seats on either side of said ridge, split spacing rings mounted on said seats and at opposite sides of said ridge, each of said spacing rings diverging outwardly of said body and forming an abutment against which said rims are clamped, the ridge forming an abutment to receive said rings on opposite sides thereof, there being pockets on the opposite sides of said body, wedge block positioned in said pockets and adapted to engage said seats and the margins of said rims, and bolt means for drawing said wedge blocks together to move said rims against the spacing rings and the rings against said ridge.

8. In a wheel, the combination of a wheel body, a ridge extending radially outwardly from said body, oppositely diverging spacing rings positioned on said body and against said ridge, oppositely disposed pockets formed in said body adjacent said ridge, wedge blocks positioned in said pockets, each of said blocks having a flared wedging portion contacting with said body, and rims carried by said body and each having a margin adjacent the central plane of the wheel adapted to be clamped between one of said spacing rings and said flared wedging portion.

9. In a wheel, the combination with a wheel body having radiating spokes and means thereon including transverse seats with shoulder means substantially in the central plane of the wheel body for supporting separate tire-carrying rims mounted on the peripheral portion thereof with the adjacent margins of the rims extending over the seats and being inwardly directed with respect to each other, of spacing rings mounted on the wheel body between said rims, the adjacent margins of said spacing rings being adapted to bear against opposite sides of said shoulder means and their opposite margins being adapted to bear against the adjacent margins of said rims, wedge means interposed between said seats and the inwardly directed portions of said rims, and bolt means passing through the ends of said spokes and acting to press the wedge means against the rims, the rims against the spacing rings and the spacing rings against said shoulder means, whereby tightening said bolt means effectively fixes said rims at equal distances from the central plane of the wheel body.

10. A wheel comprising a wheel body having a hub and spokes radiating therefrom, said spokes having seats at their outer ends, said wheel body being arranged to support separate tire carrying rims mounted on said seats at opposite sides of the wheel body, spacing rings mounted on said seats between said rims, said rings being split to permit both of them being slipped onto their respective seats from one side of the wheel, said seats carrying abutment means between said rings, separate wedge blocks mounted on said spokes at opposite sides thereof adjacent to their radially outer ends and movable inwardly with respect to each other to engage the adjacent marginal portions of said rims at points substantially in the plane of their inner edges to draw said rims against said spacing rings and secure the rims and rings on the wheel body, and means for applying inward pressure to said wedge blocks to move them to their clamping position.

11. A vehicle wheel comprising a wheel body having a hub and spokes radiating therefrom, said spokes having seats at their outer ends arranged to support separate tire carrying rims mounted thereon, wedging means at opposite sides of the wheel body interposed between the adjacent margins of said rims and said seats, shoulders formed on said seats centrally thereof, spacing rings mounted on the wheel body between said rims, the adjacent margins of said spacing rings having engagement with said shoulders and the remote margins thereof having engagement with the adjacent margins of said rims, and means carried by said spokes for forcing said wedging means inwardly to draw said rims tightly against said spacing rings and secure said rims and rings upon the wheel body.

12. In a vehicle, a wheel body comprising a wheel hub and spokes, means at the ends of said spokes forming opposed centrally disposed peripheral shoulders, spacing rings having substantial depth of cross section radially and thereby strengthened against radial stresses, said rings being adapted to be seated against said shoulders on both sides thereof and both rings being removable from one side of said wheel body, tire carrying rims having adjacent radially inwardly extending margins adapted to bear against said spacing rings, and clamping means adapted to draw the tire carrying rims against said spacing rings and said spacing rings against said shoulders whereby the rims are aligned equidistantly from the central plane of the wheel body.

13. In a vehicle wheel, a wheel body comprising a wheel hub and spokes, means at the ends of the spokes forming opposed centrally disposed radial shoulders facing outwardly with respect to the central plane of the wheel body, spacing rings of irregular cross section and thereby strengthened against radial stresses, said rings being adapted to be seated in said grooves against said outwardly facing shoulders, tire carrying rims having adjacent margins adapted to bear against said spacing rings, and clamping means adapted to draw said rims together against said spacing rings and said rings against said shoulders whereby said rims are aligned equidistantly from the central plane of the wheel body.

14. A wheel comprising a wheel body, abutment means lying substantially in the central plane of said wheel body and formed integral therewith, seats on either side of the abutment means and spaced radially inwardly of the plane thereof, spacing rings mounted on opposite sides of said abutment means and each diverging radially outwardly of the wheel body, adjacent portions of the spacing rings contacting with opposite sides of said abutment means and the opposite portions of the spacing rings forming abutments against which the rims may be clamped, the rims being of larger diameter than said abutment means, and means comprising blocks lying between said seats and the rims for drawing the rims against the spacing rings and the spacing rings against the abutment means.

FREDERICK W. BURGER.